(12) United States Patent
Chiu et al.

(10) Patent No.: US 8,960,038 B2
(45) Date of Patent: Feb. 24, 2015

(54) MOTION TRANSMISSION MODULE WITH A COOLING DEVICE

(71) Applicant: Hiwin Technologies Corp., Taichung (TW)

(72) Inventors: Yueh-Ling Chiu, Taichung (TW); Jonus Liu, Taichung (TW)

(73) Assignee: Hiwin Technologies Corp., Taichung (TW)

( * ) Notice: Subject to any disclaimer, the term of this patent is extended or adjusted under 35 U.S.C. 154(b) by 21 days.

(21) Appl. No.: 14/049,405

(22) Filed: Oct. 9, 2013

(65) Prior Publication Data

US 2014/0033847 A1  Feb. 6, 2014

Related U.S. Application Data

(63) Continuation-in-part of application No. 13/251,244, filed on Oct. 1, 2011, now abandoned.

(51) Int. Cl.
| | |
|---|---|
| F16H 3/06 | (2006.01) |
| F16H 27/02 | (2006.01) |
| F16H 29/02 | (2006.01) |
| F16H 29/20 | (2006.01) |
| F16H 1/24 | (2006.01) |
| F16H 55/02 | (2006.01) |
| F16H 57/04 | (2010.01) |
| F16H 25/22 | (2006.01) |

(52) U.S. Cl.
CPC ........ F16H 57/0497 (2013.01); F16H 57/0412 (2013.01); F16H 25/2214 (2013.01)
USPC ............. 74/424.82; 74/424.71; 74/424.86; 74/89.4

(58) Field of Classification Search
CPC ............ F16H 57/0497; F16H 57/0412; F16H 57/0417; F16H 25/2214
USPC ............ 165/80.1, 80.5, 80.4, 104.19
See application file for complete search history.

(56) References Cited

U.S. PATENT DOCUMENTS

| | | | | |
|---|---|---|---|---|
| 4,206,805 | A * | 6/1980 | Beckett | 165/80.5 |
| 6,158,232 | A * | 12/2000 | Tsuji et al. | 62/259.2 |
| 6,343,644 | B1 * | 2/2002 | Huang et al. | 165/90 |
| 6,568,508 | B2 * | 5/2003 | West et al. | 184/5 |
| 6,848,498 | B2 * | 2/2005 | Seki et al. | 165/80.1 |
| 6,966,359 | B1 * | 11/2005 | Liu | 165/104.21 |
| 7,352,577 | B2 * | 4/2008 | Chen et al. | 361/699 |
| 2002/0152822 | A1 * | 10/2002 | Chuo | 74/89.13 |
| 2003/0089187 | A1 * | 5/2003 | Liao | 74/424.81 |
| 2008/0185924 | A1 * | 8/2008 | Masoudipour et al. | 310/54 |
| 2010/0170359 | A1 * | 7/2010 | Chen et al. | 74/424.83 |
| 2011/0154924 | A1 * | 6/2011 | Chiu et al. | 74/89.43 |
| 2012/0144944 | A1 * | 6/2012 | Yamamoto et al. | 74/424.81 |

\* cited by examiner

*Primary Examiner* — William Kelleher
*Assistant Examiner* — Jake Cook
(74) *Attorney, Agent, or Firm* — Patent Office of Bang Shia

(57) ABSTRACT

A motion transmission module with a cooling device is aimed at solving the disadvantage of the conventional motion transmission module that the cooling structure of the conventional motion transmission module would increase the length or outer diameter of the nut. The nut is formed with a flat surface for mounting the cooling device, so that the length of the nut won't be increased. Furthermore, the cooling device also serves as a positioning block to fix the return member, it doesn't increase the outer diameter of the nut.

2 Claims, 10 Drawing Sheets

MOTION TRANSMISSION MODULE WITH A COOLING DEVICE

This application is a continuation in part of U.S. patent application Ser. No. 13/251,244, which claims the benefit of the earlier filing date of Oct. 1, 2011. Claims 1-2 of this application are revised from claim 1 of the U.S. patent application Ser. No. 13/251,244.

BACKGROUND OF THE INVENTION

1. Field of the Invention

The present invention relates to a motion transmission module, and more particularly to a motion transmission module with a cooling device.

2. Description of the Prior Art

When a motion transmission module (such as ball or roller screw) is used in heaving load conditions, with the increase in axial load, the temperature of the nut will also increase, which will affect the running accuracy. Hence, the existing nuts are normally provided with a cooling system.

Referring to FIG. 1, a conventional technique for cooling the nut of a ball screw is shown, wherein the nut 11 is formed with a plurality of straight holes 111 and arc-shaped grooves 112, and at the front end and flange end of the nut 11 are disposed anti-leak cushions 113 and an end cap 114, so as to form a cooling system.

Since it has to arrange the end cap 114 at the end surface of this cooling nut, the length of the nut 11 must be increased (as compared to the nut without cooling system), which will result in the reduction of the travel length of the ball screw or roller screw equipped with such cooling nut.

As shown in FIG. 2, another conventional nut cooling structure is shown, wherein the nut 12 is formed with an inlet 121 and an outlet 122 for inputting and discharging of cooling liquid, and an outer cover 13 is mounted on the nut 12 to form a cooling groove 14, and then two O-rings 15, 16 are used to prevent the cooling liquid leakage.

The outer cover 13 increases the outer diameter of the nut 12 as compared to the nut without cooling system, so that it is inconvenient to the user who uses the ball or roller screw which was originally equipped with a non-cooling-system nut, since it has to redesign the nut mounting seat when the non-cooling-system nut is replaced with a cooling nut of the same size.

The present invention has arisen to mitigate and/or obviate the afore-described disadvantages.

SUMMARY OF THE INVENTION

The primary object of the present invention is to provide a motion transmission module with a cooling device, wherein the temperature of the nut can be cooled down without changing the length of the nut and redesigning the nut mounting seat.

Another object of the present invention is to provide a motion transmission module with a cooling device, wherein the temperature of the nut can be cooled down without changing the outer diameter of the nut and without redesigning the nut mounting seat of the machine.

To achieve the above object, a motion transmission module with a cooling device in accordance with the present invention comprises a screw, a nut, a return member, a plurality of rolling elements, and a cooling device. The screw a screw formed with an outer helical groove. The nut includes a body, a penetrating hole penetrating through the body and provided for insertion of the screw, an inner helical groove formed in an inner surface of the hole to define a load path by cooperating with the outer helical groove, a flat surface formed on an outer surface of the body, and two through holes defined in the flat surface and in communication with the inner helical grooves. The return member includes two legs inserted in the two through holes and a return path running through the two legs. The plurality of rolling elements is movably received in the load path and the return path. The cooling device is fixed on the body of the nut and has a mounting surface to be abutted against the flat surface, a cooling circulation system, and a positioning groove formed in the mounting surface. At a front end of the cooling circulation system is formed an inlet which is located on a peripheral surface of the cooling device, and at a rear end of the cooling circulation system is formed an outlet which is located on a peripheral surface of the cooling device, the positioning groove is formed with a bottom to be abutted against the return member. The cooling circulation system is formed by machining process, the cooling circulation system includes a plurality of transverse passages, and longitudinal passages, the inlet is located in a last one of the transverse passages, and the outlet is located in a first one of the transverse passages. The transverse passages, the longitudinal passages, the outlet and the inlet are in communication with one another to form a single route, and then the transverse and longitudinal passages are sealed with sealing members to prevent leakage of cooling liquid, so as to form the cooling circulation system with the inlet and outlet.

To achieve the above object, another motion transmission module with a cooling device in accordance with the present invention comprises a screw, a nut, a return member, a plurality of rolling elements, and a cooling device. The screw is formed with an outer helical groove. The nut includes a body, a penetrating hole penetrating through the body and provided for insertion of the screw, an inner helical groove formed in an inner surface of the hole to define a load path by cooperating with the outer helical groove, a flat surface formed on an outer surface of the body, and two through holes defined in the flat surface and in communication with the inner helical grooves. The return member includes two legs inserted in the two through holes and a return path running through the two legs. The plurality of rolling elements is movably received in the load path and the return path. The cooling device is fixed on the body of the nut and has a mounting surface to be abutted against the flat surface, a cooling circulation system, and a positioning groove formed in the mounting surface. At a front end of the cooling circulation system is formed an inlet which is located on a peripheral surface of the cooling device, and at a rear end of the cooling circulation system is formed an outlet which is located on a peripheral surface of the cooling device, the positioning groove is formed with a bottom to be abutted against the return member. The cooling circulation system of the cooling device is an integrally formed U-shaped passage.

DETAILED DESCRIPTION OF THE PREFERRED EMBODIMENTS

Figure 1:
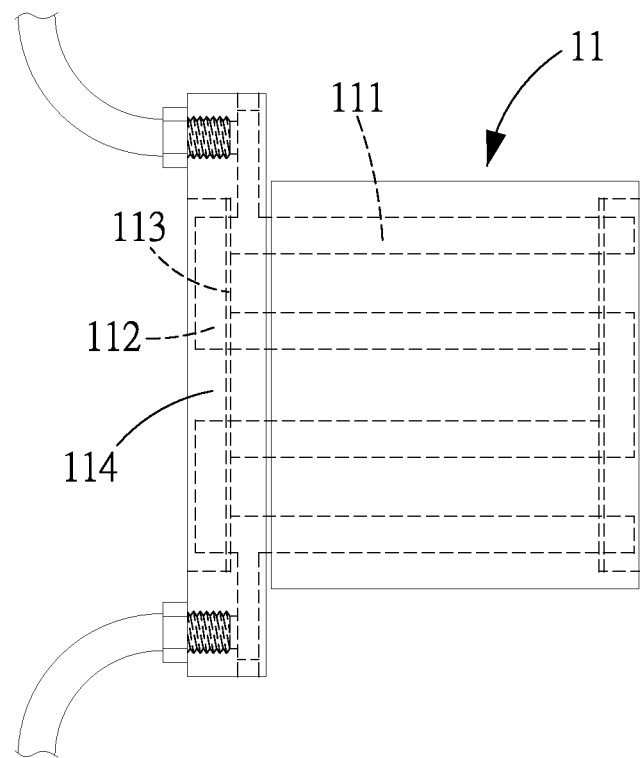
FIG. 1 is an illustrative view of a conventional nut cooling structure.
Figure 2:
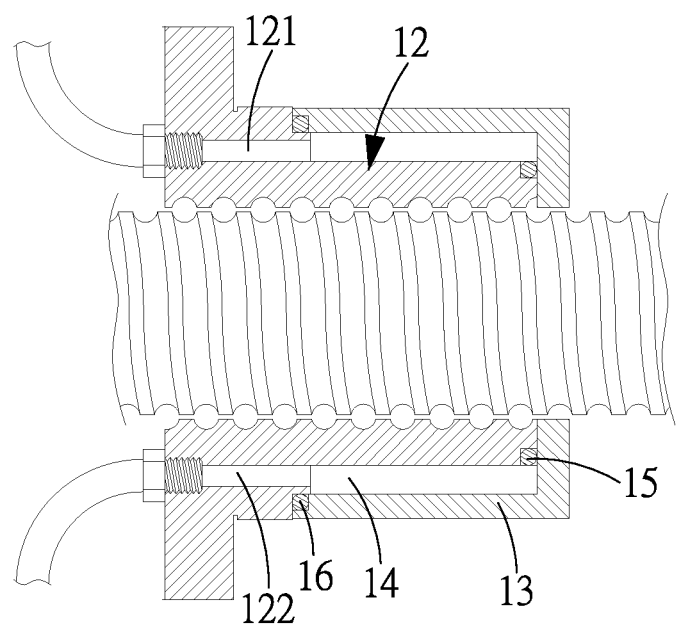
FIG. 2 shows another conventional nut cooling structure.
Figure 3:
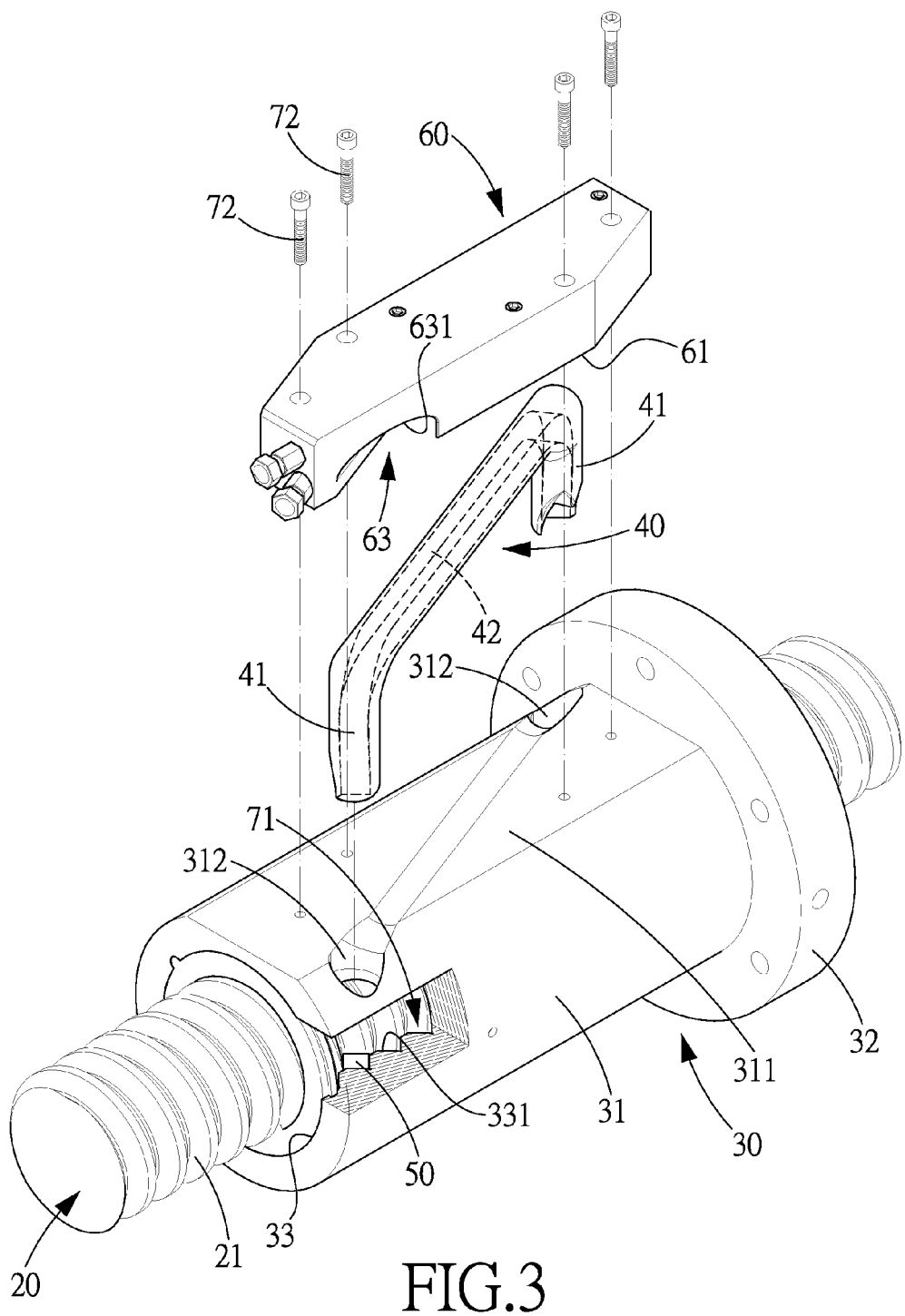
FIG. 3 is an exploded view of a motion transmission module with a cooling device in accordance with the present invention.
Figure 4:
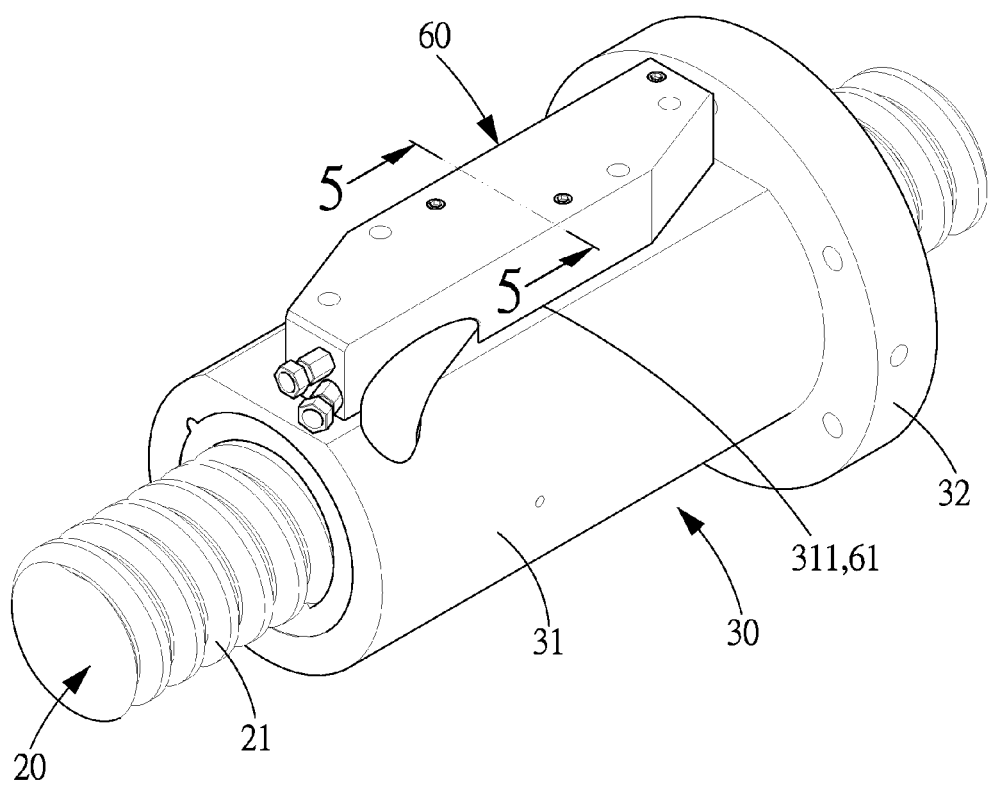
FIG. 4 is an assembly view of the motion transmission module with a cooling device in accordance with the present invention.
Figure 5:
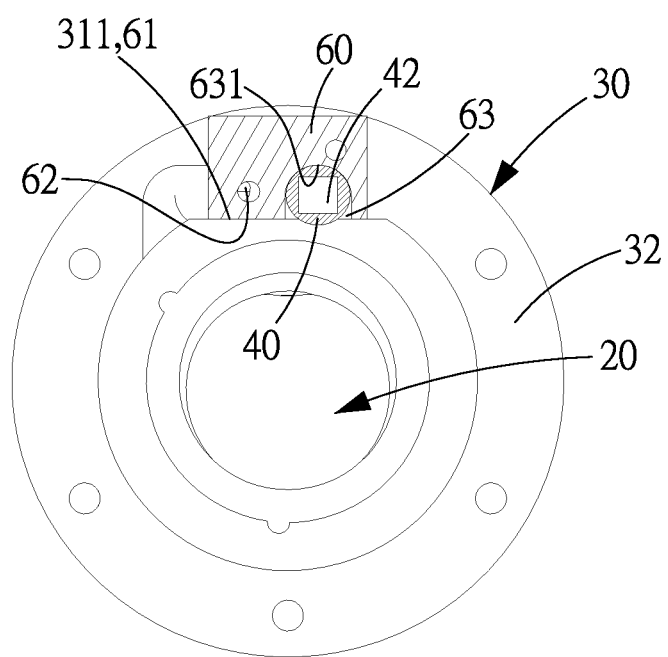
FIG. 5 is a cross sectional view taken along the line 4-4 of FIG. 4.

The present invention will be clearer from the following description when viewed together with the accompanying drawings, which show, for purpose of illustrations only, the preferred embodiment in accordance with the present invention.

Referring to FIGS. 3-6, a motion transmission module with a cooling device in accordance with a first preferred embodiment of the present invention comprises: a screw 20, a nut 30, a return member 40, a plurality of rolling elements 50, and a cooling device 60.

The screw 20 is formed with an outer helical groove 21.

The nut 30 includes a body 31, a head 32 (namely the flange), a penetrating hole 33 which penetrates through the head 32 and the body 31 and is provided for insertion of the screw 20, an inner helical groove 331 formed in the inner surface of the hole 33 to define a load path 71 by cooperating with the outer helical groove 21, a flat surface 311 formed on the outer surface of the body 31, and two through holes 312 defined in the flat surface 311 and in communication with the inner helical grooves 331.

The return member 40 includes two legs 41 inserted in the two through holes 312 and a return path 42 running through the legs 41.

The rolling elements 50 are movably received in the load path 71 and the return path 42.

The cooling device 60 is in the form a block to be fixed on the flat surface 311 of the body 31 of the nut 30 by screws 72 (or by any other possible means, such as pins, locking, or rings) and includes a mounting surface 61 to be abutted against the flat surface 311, a cooling circulation system 62 in the form of a single route, and a positioning groove 63 formed in the mounting surface 61. The positioning groove 63 is formed with a bottom 631 to be abutted against the return member 40.

When the cooling circulation system 62 of the cooling device 60 is formed by machining process and includes a plurality of transverse passages 621, a longitudinal passages 622 in the form of a single route for connecting the transverse passages 621 with one another, an outlet 623 connected to a cooling machine (not shown) and an inlet 624 for inputting and discharging of the cooling liquid, respectively. The transverse and longitudinal passages 621, 622, namely at the surface of the cooling device 60, are sealed with sealing members 73 (headless screws or copper plugs or by other sealing means) to prevent leakage of cooling liquid so as to form the cooling circulation system 62 with the outlet 623 and the inlet 624.

It is to be noted that the inlet 624 is the front end of the cooling circulation system 62 and located on the peripheral surface of the cooling device 60, in other words, the inlet 624 is located in the last one of the transverse passages 621. The outlet 623 is the rear end of the cooling circulation system 62 and located on the peripheral surface of the cooling device 60, in other words, the outlet 623 is located in the first one of the transverse passages 621.

The transverse passages 621, the longitudinal passages 622, the outlet 623 and the inlet 624 are in communication with one another to form a single route.

Figure 7:
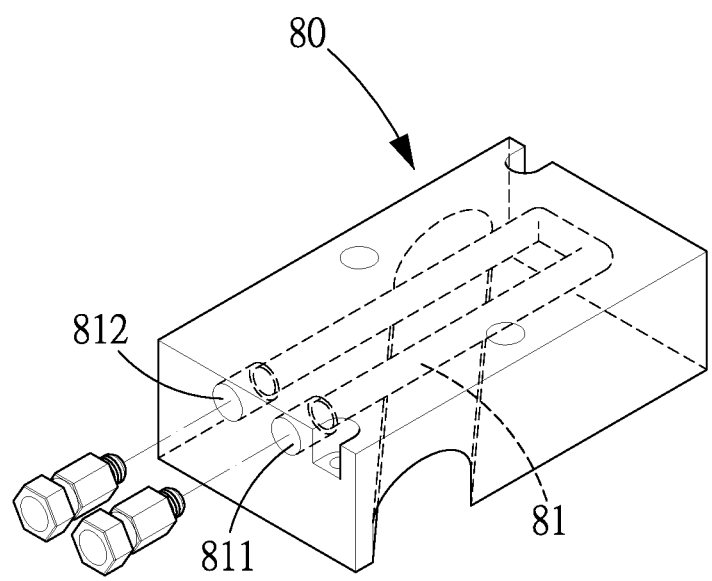
FIG. 7 is a perspective view of the cooling device in accordance with a second embodiment of the present invention.

As shown in FIG. 7, which shows another embodiment of the present invention, wherein a cooling circulation system 81 of the cooling device 80 is integrally formed (by lost wax casting), and the cooling circulation system 81 is a U-shaped single passage including an outlet 811 and an inlet 812.

When the motion transmission module is running, the cooling device 60 which is in contact with the flat surface 311 of the nut 30 can cools down the nut 30, so as to prevent the running accuracy of the motion transmission module from being affected. Hence, the nut 30 can be cooled down without changing the length of the nut 30, namely, the cooling device 60 doesn't increase the length of the nut 30.

It is to be noted that since the outlet 623 and the inlet 624 of the cooling device 60 are connected to a cooling machine, cooling liquid can be outputted from the cooling machine and flows into the cooling circulation system 62 through the inlet 624 to absorb the heat energy transmitted to the cooling device 60 from the nut 30, and finally the cooling liquid flow out of the outlet 623 to take the heat energy away from the cooling device 60, thus cooling down the nut and maintaining the running accuracy of the motion transmission module.

Furthermore, since the cooling device 60 also serves as a positioning block to fix the return member 40, it doesn't increase the outer diameter of the nut 30.

The cooling device 60 is further formed with the positioning groove 63 to fix the return member 40, and the bottom 631 of the positioning groove 63 is pressed against the return member 40, so that the cooling device 60 can also cool down the return member 40.

Figure 6:
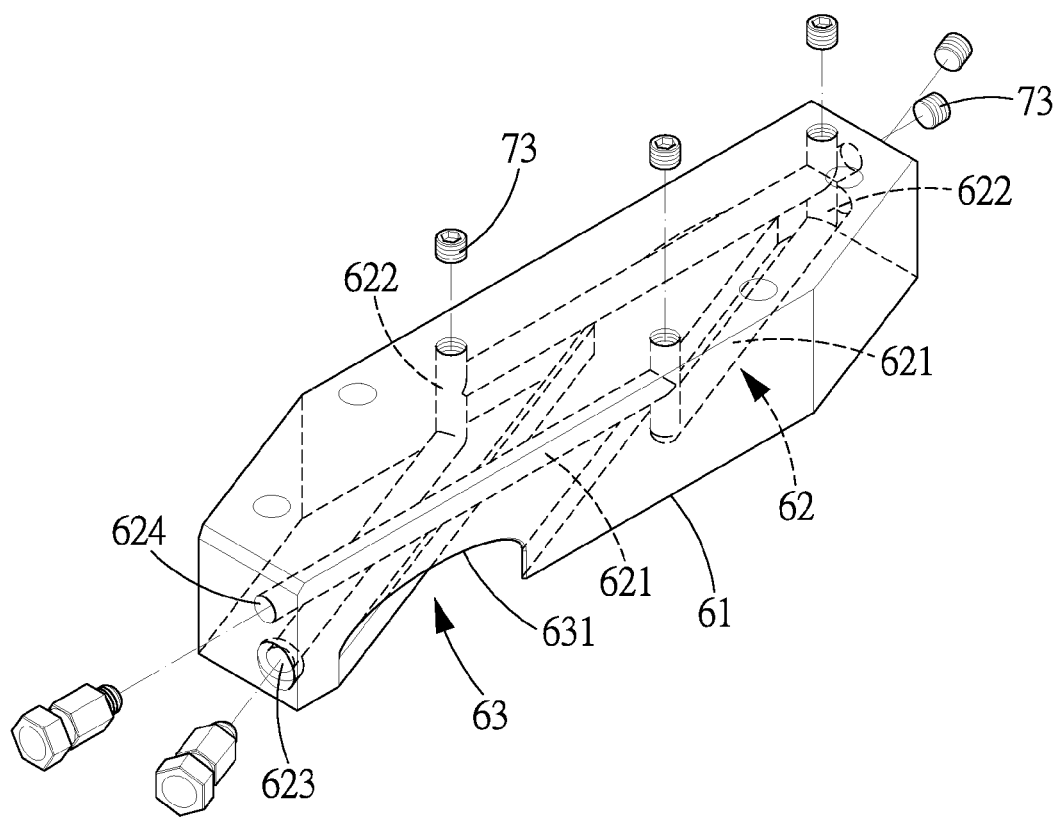
FIG. 6 is a perspective view of the cooling device in accordance with a first embodiment of the present invention.
Figure 8:
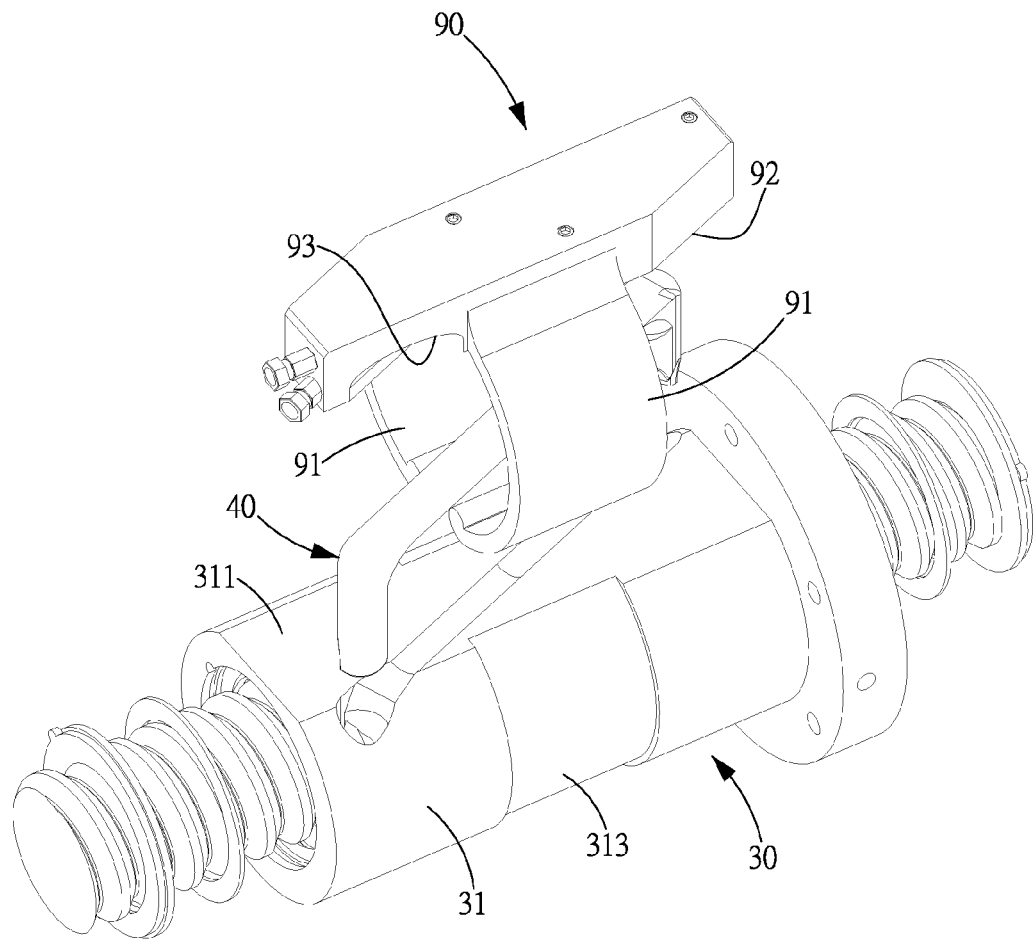
FIG. 8 is an exploded view of a motion transmission module with a cooling device in accordance with another embodiment of the present invention.
Figure 9:
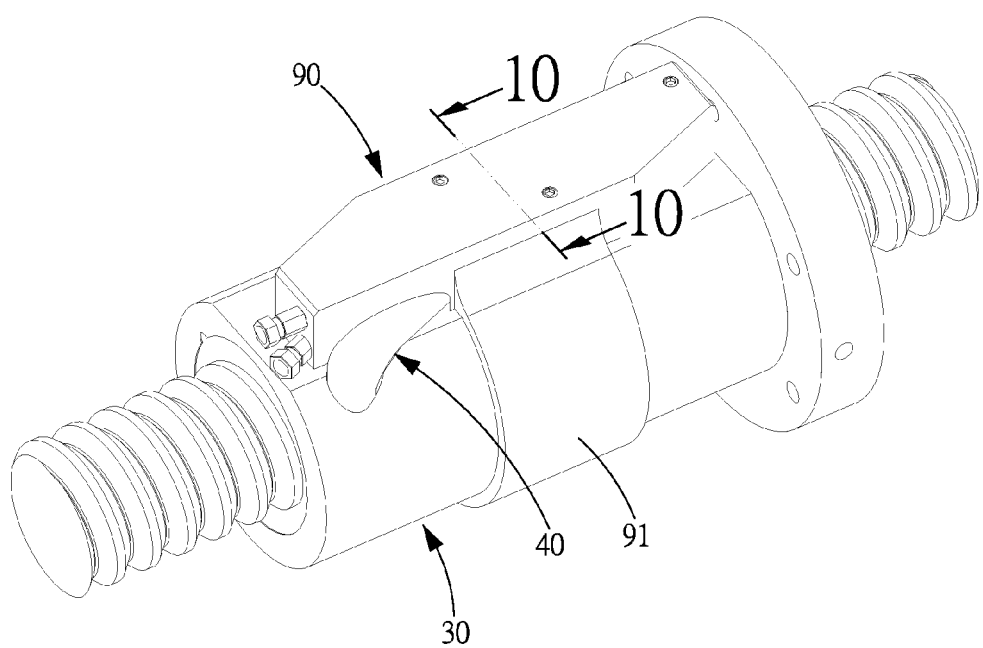
FIG. 9 is an assembly view of the motion transmission module with a cooling device in accordance with another embodiment of the present invention.
Figure 10:
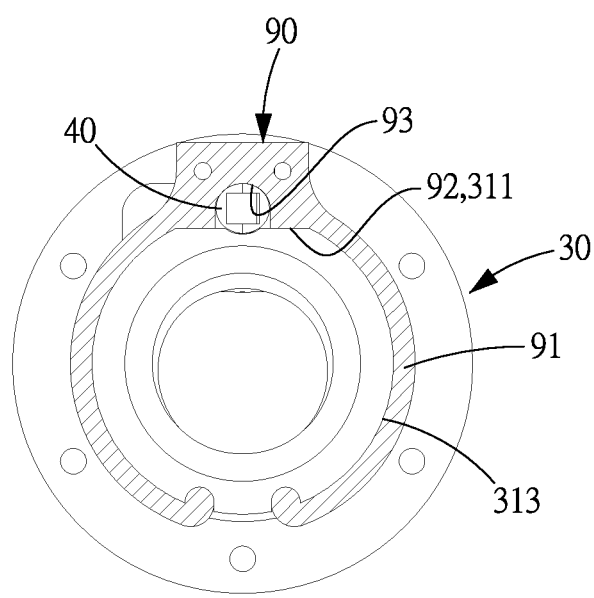
FIG. 10 is a cross sectional view taken along the line 10-10 of FIG. 9.

It is to be noted that, as shown in FIG. 6, when the cooling circulation system 62 of the cooling device 60 takes the form of a single route formed by the plurality of transverse passages 621 and longitudinal passages 622, and it can be made by machining process, and as shown FIG. 7, when the cooling circulation system 81 of the cooling device 80 is integrally formed, it can be made by lost wax casting. The cooling circulation system is normally fixed to the nut by screws no matter it is made by machining process or lost wax casting. As shown in FIGS. 8-10, a cooling circulation system 90 in accordance with another embodiment of the present invention is integrally provided with an elastic engaging portion 91 to be engaged with the body 31 of the nut 30 and also has a mounting surface 92 abutted against the flat surface 311 of the nut 30 and a bottom 93 abutted against the return member 40. In this embodiment, the body 31 of the nut 30 is formed with an engaging groove 313 for engaging with the engaging portion 91 of the cooling circulation system 90.

While we have shown and described various embodiments in accordance with the present invention, it is clear to those skilled in the art that further embodiments may be made without departing from the scope of the present invention.

What is claimed is:

1. A motion transmission module with a cooling device comprising:
    a screw formed with an outer helical groove;
    a nut including a body, a penetrating hole penetrating through the body and provided for insertion of the screw, an inner helical groove formed in an inner surface of the hole to define a load path by cooperating with the outer helical groove, a flat surface formed on an outer surface of the body, and two through holes defined in the flat surface and in communication with the inner helical grooves;

a return member including two legs inserted in the two through holes and a return path running through the two legs;

a plurality of rolling elements movably received in the load path and the return path; and a cooling device fixed on the body of the nut and having a mounting surface to be abutted against the flat surface, a cooling circulation system, and a positioning groove formed in the mounting surface, at a front end of the cooling circulation system being formed an inlet which is located on a peripheral surface of the cooling device, and at a rear end of the cooling circulation system being formed an outlet which is located on a peripheral surface of the cooling device, the positioning groove being formed with a bottom to be abutted against the return member;

wherein the cooling circulation system is formed by machining process, the cooling circulation system includes a plurality of transverse passages, and longitudinal passages, the inlet is located in a last one of the transverse passages, and the outlet is located in a first one of the transverse passages;

the transverse passages, the longitudinal passages, the outlet and the inlet are in communication with one another to form a single route, and then the transverse and longitudinal passages are sealed with sealing members to prevent leakage of cooling liquid, so as to form the cooling circulation system with the inlet and outlet.

2. A motion transmission module with a cooling device comprising:

a screw formed with an outer helical groove;

a nut including a body, a penetrating hole penetrating through the body and provided for insertion of the screw, an inner helical groove formed in an inner surface of the hole to define a load path by cooperating with the outer helical groove, a flat surface formed on an outer surface of the body, and two through holes defined in the flat surface and in communication with the inner helical grooves;

a return member including two legs inserted in the two through holes and a return path running through the two legs;

a plurality of rolling elements movably received in the load path and the return path; and a cooling device fixed on the body of the nut and having a mounting surface to be abutted against the flat surface, a cooling circulation system, and a positioning groove formed in the mounting surface, at a front end of the cooling circulation system being formed an inlet which is located on a peripheral surface of the cooling device, and at a rear end of the cooling circulation system being formed an outlet which is located on a peripheral surface of the cooling device, the positioning groove being formed with a bottom to be abutted against the return member;

wherein the cooling circulation system of the cooling device is an integrally formed U-shaped passage.

* * * * *